United States Patent
Misawa

(10) Patent No.: US 9,979,238 B2
(45) Date of Patent: May 22, 2018

(54) POWER TRANSMISSION DEVICE AND ELECTRIC POWER TRANSFER SYSTEM

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/413,789

(22) Filed: Jan. 24, 2017

(65) Prior Publication Data

US 2017/0222482 A1    Aug. 3, 2017

(30) Foreign Application Priority Data

Feb. 2, 2016    (JP) .................................. 2016-017838

(51) Int. Cl.

| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 7/02* | (2016.01) |

(Continued)

(52) U.S. Cl.
CPC ............ *H02J 50/12* (2016.02); *B60L 11/182* (2013.01); *H02J 7/025* (2013.01); *H02M 3/335* (2013.01); *H02M 3/33569* (2013.01); *B60L 2210/40* (2013.01); *H02M 1/32* (2013.01); *Y02T 10/7005* (2013.01); *Y02T 10/7072* (2013.01);

(Continued)

(58) Field of Classification Search
CPC .... H02J 50/12; H02J 7/02; H02J 7/025; H02J 5/00; H02J 5/005; H02J 17/00; H02J 3/00; B60L 11/18; B60L 11/182; B60L 2210/40; H02M 7/537; H02M 3/335; H02M 3/24; H04B 3/00
USPC ...... 307/104, 43, 75, 89, 123, 139; 363/131, 363/98, 17, 16, 41
See application file for complete search history.

(56) References Cited

U.S. PATENT DOCUMENTS 5,111,377 A * 5/1992 Higasa ...................... H02J 3/38
363/131
6,058,036 A * 5/2000 Endo ................. H02M 7/53875
363/98

(Continued)

FOREIGN PATENT DOCUMENTS

| JP | 2013-110822 A | 6/2013 |
|---|---|---|
| JP | 2013-126327 A | 6/2013 |

(Continued)

*Primary Examiner* — Rexford Barnie
*Assistant Examiner* — Jagdeep Dhillon
(74) *Attorney, Agent, or Firm* — Oliff PLC

(57) ABSTRACT

A turn-on current controller performs turn-on current control, based on turn-on current. A transmission power controller performs transmission power control so that the magnitude of transmission power approaches a target of the transmission power. A power transmission coil current controller performs power transmission coil current control so as to minimize current flowing through a power transmission coil. The transmission power control and the power transmission coil current control are not executed, during execution of the turn-on current control. At least one of the transmission power control or the power transmission coil current control is executed while the turn-on current control is not being executed.

4 Claims, 12 Drawing Sheets

(51) Int. Cl.
  *B60L 11/18* (2006.01)
  *H02M 3/335* (2006.01)
  *H02M 1/32* (2007.01)

(52) U.S. Cl.
  CPC .......... *Y02T 10/7241* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 2013/0127409 A1 | 5/2013 | Ichikawa | |
| 2013/0193749 A1 | 8/2013 | Nakamura et al. | |
| 2014/0133197 A1* | 5/2014 | Chapman | H02M 3/33523 363/37 |
| 2015/0008877 A1 | 1/2015 | Ichikawa et al. | |
| 2015/0048788 A1* | 2/2015 | Doffin | B60L 11/1812 320/108 |
| 2015/0280455 A1* | 10/2015 | Bosshard | H02J 5/005 307/104 |
| 2015/0357827 A1* | 12/2015 | Muratov | H02J 50/10 307/104 |
| 2016/0089985 A1* | 3/2016 | Murayama | H02J 50/12 307/10.1 |
| 2016/0114688 A1* | 4/2016 | Koizumi | H02J 5/005 307/104 |
| 2016/0365752 A1 | 12/2016 | Misawa et al. | |

FOREIGN PATENT DOCUMENTS

| | | |
|---|---|---|
| JP | 2013-146148 A | 7/2013 |
| JP | 2013-146154 A | 7/2013 |
| JP | 2013-154815 A | 8/2013 |
| JP | 2014-207795 A | 10/2014 |
| JP | 2016-111902 A | 6/2016 |
| JP | 2017-005865 A | 1/2017 |

* cited by examiner

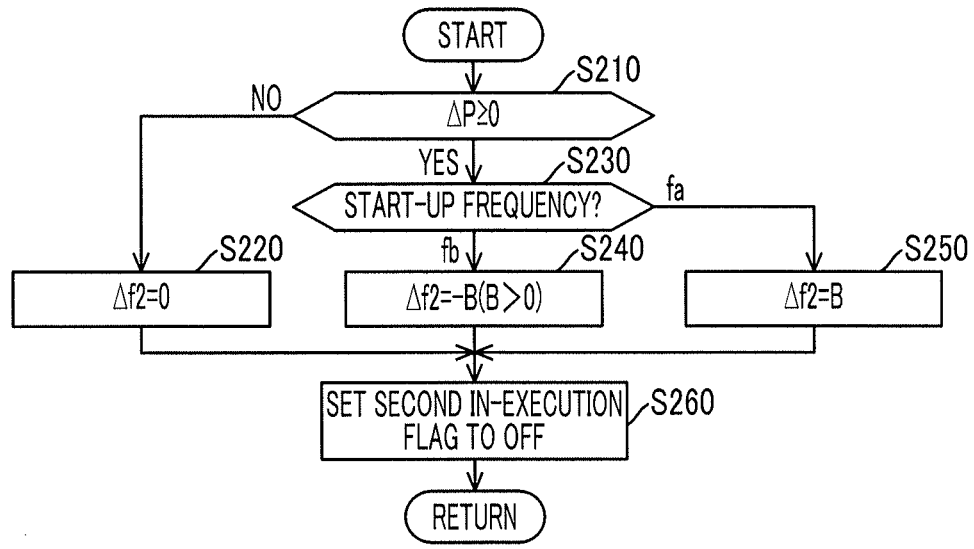
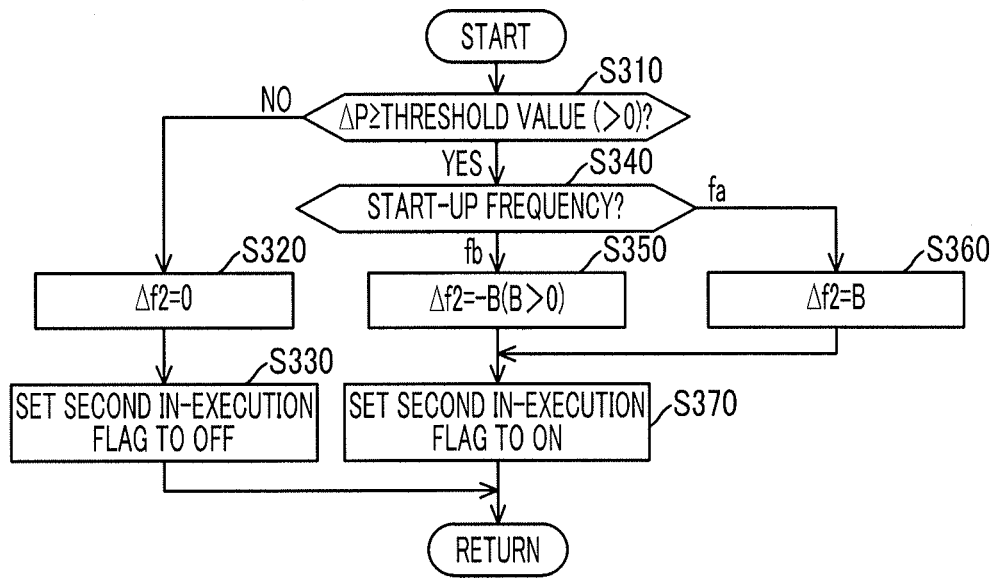

POWER TRANSMISSION DEVICE AND ELECTRIC POWER TRANSFER SYSTEM

INCORPORATION BY REFERENCE

The disclosure of Japanese Patent Application No. 2016-017838 filed on Feb. 2, 2016 including the specification, drawings and abstract is incorporated herein by reference in its entirety.

BACKGROUND

1. Technical Field

The present disclosure relates to a power transmission device and an electric power transfer system, and, in particular, to a power transmission device that contactlessly transmits electric power to a power receiving device, and an electric power transfer system including the power transmission device.

2. Description of Related Art

Electric power transfer systems each configured to contactlessly transfer electric power from a power transmission device to a power receiving device are known (see, for example, Japanese Patent Application Publications No. 2014-207795 (JP 2014-207795 A), No. 2013-154815 (JP 2013-154815 A), No. 2013-146154 (JP 2013-146154 A), No. 2013-146148 (JP 2013-146148 A), No. 2013-110822 (JP 2013-110822 A), and No. 2013-126327 (JP 2013-126327 A)). As one example of the electric power transfer systems, JP 2014-207795 A discloses a contactless power feed system that contactlessly feeds electric power from a power feed device (power transmission device) to a vehicle (power receiving device). In the contactless power feed system, the power feed device includes a power transmission coil, an inverter, and a controller. The power transmission coil contactlessly transmits electric power to a power receiving coil installed on the vehicle. The inverter produces alternate current according to the drive frequency, and delivers the current to the power transmission coil. The controller obtains a command of charging power to a battery and output power to the battery, from the vehicle side, and controls the drive frequency of the inverter in a feedback manner, so that the output power follows the charging power command (see JP 2014-207795 A).

As in the contactless power feed system described in JP 2014-207795 A, it is possible to control the magnitude of electric power to be transmitted (which will be called "transmission power"), by adjusting the frequency, and thus ensure the capability of following desired electric power (which will also be called "transmission power control").

By controlling the frequency, it is also possible to control the phase of the output current of the inverter relative to that of the output voltage of the inverter. In the inverter of voltage type, if the phase of the current leads the phase of the voltage, recovery current flows through a flyback diode of the inverter, and the inverter may break down. Thus, when the phase of the current lead the phase of the voltage, the inverter can be protected by adjusting the frequency in such a direction as to delay the phase of the current. In this connection, the lead of the current phase relative to the voltage phase can be detected, depending on whether positive current (positive turn-on current) flows when the voltage rises. Accordingly, the frequency can be adjusted in the direction to delay the current phase, based on a detection value of the turn-on current. In the following description, the control based on the detection value of the turn-on current will also be called "turn-on current control".

Further, it is possible to control current flowing through the power transmission coil under a condition that electric power is maintained, by adjusting the frequency. Thus, the frequency is adjusted so that the current flowing through the power transmission coil is minimized, whereby the efficiency of electric power transfer between the power transmission coil and the power receiving coil can be enhanced. In the following description, this control will also be called "power transmission coil current control".

Each of the above-described controls is performed by manipulating or controlling the frequency. Therefore, when the above-described three controls are implemented at the same time, the output (frequency manipulation) of certain control may have an adverse influence on the purpose of another control. However, component protection (protection of the inverter) to be achieved by the turn-on current control, as one of the purposes of the above controls, should be prioritized over the electric power following by the transmission power control, and the improvement of the power transfer efficiency by the power transmission coil current control.

SUMMARY

In view of the above-described problem, the present disclosure provides a power transmission device that contactlessly transmits electric power to a power receiving device, and an electric power transfer system including the power transmission device, wherein transmission power control, turn-on current control, and power transmission coil current control are implemented, such that component protection (protection of an inverter) is achieved with reliability.

Thus, according to one aspect of the present disclosure, a power transmission device including a power transmission coil, an inverter, and an electronic control unit is provided. The power transmission coil is configured to contactlessly transmit electric power to a power receiving device. The inverter is a voltage inverter, and is configured to produce transmission power of an alternate current and to supply the transmission power to the power transmission coil. The electronic control unit is configured to: (i) control the inverter so as to adjust a frequency of the transmission power, and (ii) inhibit second control and third control from being executed during execution of first control, and execute at least one of the second control or the third control while the first control is not being executed. The first control adjusts the frequency in such a direction as to delay a phase of an output current of the inverter, when the phase of the output current leads a phase of an output voltage of the inverter. The second control adjusts the frequency such that a magnitude of the transmission power approaches a target of the transmission power. The third control adjusts the frequency such that a current flowing through the power transmission coil is minimized under a condition that the transmission power is maintained.

According to another aspect of the present disclosure, an electric power transfer system including a power transmission device and a power receiving device is provided. The power receiving device is configured to contactlessly receive electric power from the power transmission device. The power transmission device includes a power transmission coil, an inverter, and an electronic control unit. The power transmission coil is configured to contactlessly transmit electric power to the power receiving device. The inverter is a voltage inverter, and is configured to produce transmission power of an alternate current and to supply the transmission power to the power transmission coil. The electronic control unit is configured to: (i) control the inverter so as to adjust a frequency of the transmission power, and (ii) inhibit second control and third control from being executed during execution of first control, and execute at least one of the second control or the third control while the first control is not being executed. The first control adjusts the frequency in such a direction as to delay a phase of an output current of the inverter, when the phase of the output current leads a phase of an output voltage of the inverter. The second control adjusts the frequency such that a magnitude of the transmission power approaches a target of the transmission power. The third control adjusts the frequency such that a current flowing through the power transmission coil is minimized under a condition that the transmission power is maintained.

With the power transmission device and the electric power transfer system configured as described above, the first control (turn-on current control) is performed, taking priority over the second control (transmission power control) and the third control (power transmission coil current control). Accordingly, with the power transmission device and the power transfer system as described above, when the first control through the third controls are implemented, component protection (protection of the inverter) can be achieved with reliability.

In the power transmission device as described above, the electronic control unit may be configured not to execute the third control during execution of the second control, and not to execute the second control during execution of the third control, while the first control is not being executed, after the transmission power once reaches the target of the transmission power after start-up of the inverter.

With the power transmission device configured as described above, the third control can be prevented from adversely affecting the second control during execution of the second control. Also, the second control can be prevented from adversely affecting the third control during execution of the third control.

Also, in the power transmission device as described above, the electronic control unit may be configured to execute the second control when a difference (electric power deviation) between the target of the transmission power and a detection value of the transmission power is equal to or larger than a threshold value and to execute the third control when the difference is smaller than the threshold value, while the first control is not being executed after the transmission power once reaches the target of the transmission power after start-up of the inverter.

With the power transmission device configured as described above, when the electric power deviation is large, the second control is performed, taking priority over the third control. On the other hand, when the electric power deviation is small, the third control is performed, taking priority over the second control. Consequently, the power following capability can be ensured through the second control when the power deviation is large, and the improvement of the power transfer efficiency can be achieved through the third control when the power deviation is small.

According to the present disclosure, in the power transmission device that contactlessly transmits electric power to the power receiving device, and the electric power transfer system including the power transmission device, when the first control through the third control (transmission power control, turn-on current control, and power transmission coil current control) are implemented, component protection (protection of the inverter) can be achieved with reliability.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 15 is a flowchart illustrating a control routine of pre-power-reaching control performed in step S180 of FIG. 14;

FIG. 16 is a flowchart illustrating a control routine of post-power-reaching control performed in step S200 of FIG. 14;

DETAILED DESCRIPTION OF EMBODIMENTS

Figure 1:
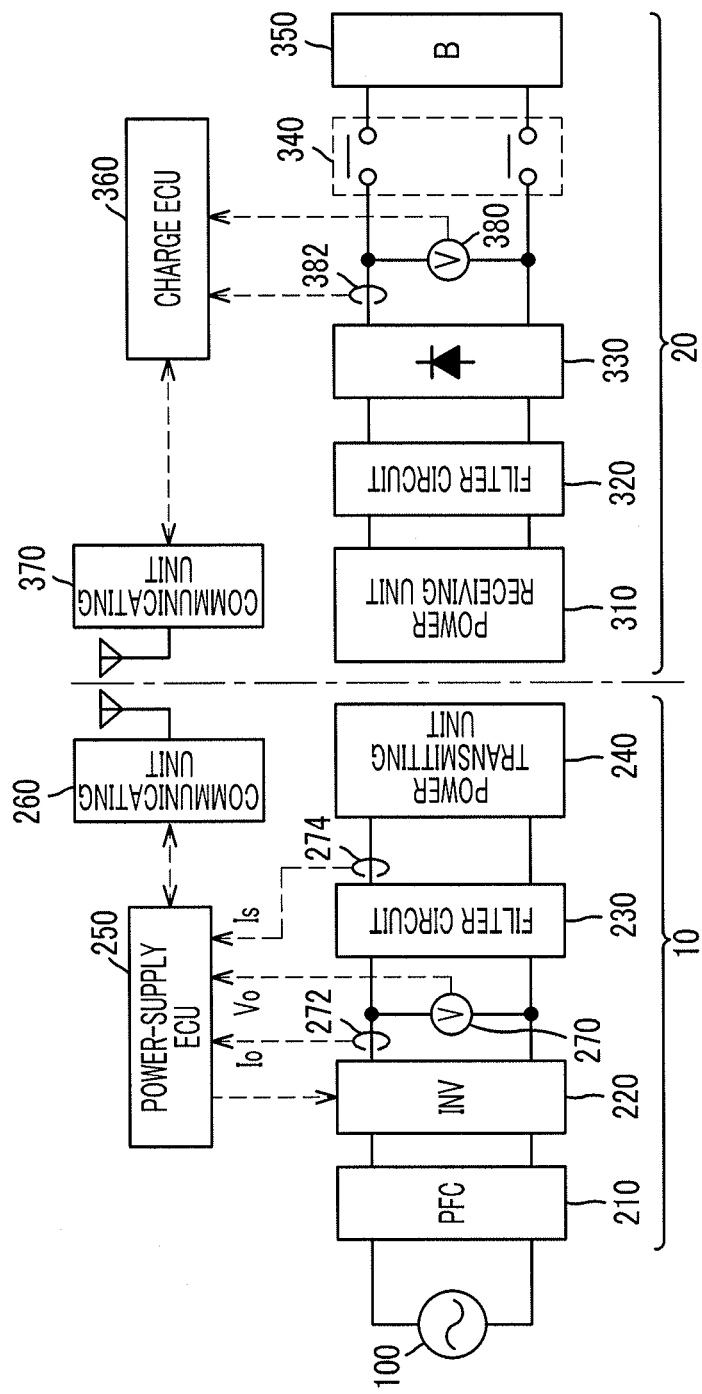
FIG. 1 is a view showing the overall configuration of an electric power transfer system in which a power transmission device according to one embodiment of the present disclosure is used.

One embodiment of the present disclosure will be described in detail with reference to the drawings. In the drawings, the same reference numerals are assigned to the same or corresponding components or portions, of which explanation will not be repeated.

FIG. 1 shows the overall configuration of an electric power transfer system in which a power transmission device according to one embodiment of the present disclosure is used. Referring to FIG. 1, the electric power transfer system includes a power transmission device 10 and a power receiving device 20. For example, the power receiving device 20 is installed on a vehicle, or the like, capable of traveling using electric power supplied from the power transmission device 10 and stored therein.

The power transmission device 10 includes a power factor correction (PFC) circuit 210, an inverter 220, a filter circuit 230, and a power transmitting unit 240. The power transmission device 10 further includes a power-supply electronic control unit (ECU) 250, a communicating unit 260, a voltage sensor 270, and current sensors 272, 274.

The PFC circuit 210, which receives electric power from an alternate current power supply 100, such as a commercial-system power supply, converts alternating current into direct current, and raises its voltage, so that the resulting direct current power is supplied to the inverter 220, and also improves the power factor by making its input current approximate to sinusoidal wave. Various known PFC circuits may be employed as the PFC circuit 210. It is, however, to be noted that a rectifier having no power factor correcting function may be employed in place of the PFC circuit 210.

The inverter 220 is controlled by the power-supply ECU 250, and converts the direct current power received from the PFC circuit 210, into transmission power (alternate current) having a given frequency (e.g., several tens of kHz). The inverter 220 can adjust the frequency of the transmission power, by changing its switching frequency according to a control signal from the power-supply ECU 250. The transmission power produced by the inverter 220 is supplied to the power transmitting unit 240 via the filter circuit 230. The inverter 220 is in the form of a single-phase full bridge circuit, for example.

The filter circuit 230 is provided between the inverter 220 and the power transmitting unit 240, and suppresses or reduces higher harmonic noise generated from the inverter 220. The filter circuit 230 is in the form of an LC filter including an inductor and a capacitor, for example.

The power transmitting unit 240 receives the alternate current power (transmission power) produced by the inverter 220, from the inverter 220, via the filter circuit 230, and contactlessly transmits the power to a power receiving unit 310 of the power receiving device 20, via a magnetic field produced around the power transmitting unit 240. The power transmitting unit 240 includes a resonance circuit (not shown) for contactlessly transmitting electric power to the power receiving unit 310. While the resonance circuit normally includes a coil and a capacitor, the capacitor may not be provided if a desired resonant condition is formed solely by the coil.

The voltage sensor 270 detects output voltage Vo of the inverter 220, and outputs its detection value to the power-supply ECU 250. The current sensor 272 detects current flowing through the inverter 220, namely, output current Io of the inverter 220, and outputs its detection value to the power-supply ECU 250. The transmission power supplied from the inverter 220 to the power transmitting unit 240 can be determined, based on the detection values of the voltage sensor 270 and the current sensor 272. The current sensor 274 detects current Is flowing through the power transmitting unit 240, and outputs its detection value to the power-supply ECU 250.

The power-supply ECU 250 includes a central processing unit (CPU), a read-only memory (ROM) that stores processing programs, etc., a random access memory (RAM) that temporarily stores data, input/output ports for receiving and generating various signals, etc., none of which is shown in the drawings. The power-supply ECU 250 receives signals from the above-described sensors, etc., and controls various devices in the power transmission device 10. For example, the power-supply ECU 250 performs switching control of the inverter 220 so that the inverter 220 produces transmission power (alternate current), when electric power is transferred from the power transmission device 10 to the power receiving device 20. Control of various devices is not necessarily implemented by software processing, but may be implemented with a dedicated hardware (e.g., an electronic circuit).

In the power transmission device 10 according to this embodiment, the power-supply ECU 250 performs control (turn-on current control) for adjusting the frequency of transmission power by manipulating the switching frequency of the inverter 220, based on a detection value of turn-on current, as main control executed by the power-supply ECU 250. Namely, the power-supply ECU 250 determines whether the phase of the output current Io of the inverter 220 leads the phase of the output voltage Vo of the inverter 220, based on the detection value of the turn-on current, and adjusts the frequency in such a direction as to delay the phase of the current, when the phase lead of the current is detected.

During power transmission from the power transmission device 10 to the power receiving device 20, the power-supply ECU 250 performs control (transmission power control) for adjusting the frequency so that the transmission power (alternate current) produced by the inverter 220 approaches a target of the transmission power. Further, the power-supply ECU 250 performs control (transmission coil current control) for adjusting the frequency so that current Is that flows through a power transmission coil (which will be described later) included in the power transmitting unit 240 is minimized, under a condition that the transmission power is maintained.

Each of the above-described controls is to adjust the frequency (use the frequency as a controlled amount), and there is a possibility that the output (frequency manipulation) of certain control has an adverse influence on the purpose of another control. Thus, in the power transmission device 10 according to this embodiment, the power-supply ECU 250 prioritizes the turn-on current control that aims at component protection (protection of the inverter 220), over the transmission power control and the power transmission coil current control. The controls performed by the power-supply ECU 250 will be described in detail later.

The communicating unit 260 is configured to conduct wireless communication with a communicating unit 370 of the power receiving device 20. The communicating unit 260 receives a target of transmission power (target power) transmitted from the power receiving device 20, gives and receives information concerning start/stop of electric power transfer to and from the power receiving device 20, and receives power receiving conditions (received voltage, received current, received power, etc.) of the power receiving device 20, from the power receiving device 20.

On the other hand, the power receiving device 20 includes the power receiving unit 310, filter circuit 320, rectifying unit 330, relay circuit 340, and a power storage device 350. The power receiving device 20 further includes a charge ECU 360, communicating unit 370, voltage sensor 380, and a current sensor 382.

The power receiving unit 310 contactlessly receives electric power (alternate current) delivered from the power transmitting unit 240 of the power transmission device 10, via a magnetic field. For example, the power receiving unit 310 includes a resonance circuit for contactlessly receiving electric power from the power transmitting unit 240. While the resonance circuit normally includes a coil and a capacitor, the capacitor may not be provided if a desired resonant condition is formed solely by the coil.

The filter circuit 320, which is provided between the power receiving unit 310 and the rectifying unit 330, suppresses or reduces higher harmonic noise generated when electric power is received by the power receiving unit 310. The filter circuit 320 is in the form of an LC filter including an inductor and a capacitor. The rectifying unit 300 converts alternating current of alternate current power received by the power receiving unit 310, into direct current, and delivers the resulting power to the power storage device 350. The rectifying unit 330 includes a smoothing capacitor as well as a rectifier.

The power storage device 350 is a rechargeable direct current power supply, and includes a secondary battery, such as a lithium-ion battery or a nickel hydride battery. The power storage device 350 stores electric power delivered from the rectifying unit 330. Then, the power storage device 350 supplies the stored electric power to a load drive unit (not shown), or the like. As the power storage device 350, an electric double layer capacitor, or the like may also be employed.

The relay circuit 340 is provided between the rectifying unit 330 and the power storage device 350. The relay circuit 340 is placed in the ON state (conduction state) when the power storage device 350 is charged with electric power from the power transmission device 10. The voltage sensor 380 detects output voltage (received voltage) of the rectifying unit 330, and outputs its detection value to the charge ECU 360. The current sensor 382 detects output current (received current) from the rectifying unit 330, and outputs its detection value to the charge ECU 360. The electric power received by the power receiving unit 310 (corresponding to charging power with which the power storage device 350 is charged) can be detected, based on the detection values of the voltage sensor 380 and current sensor 382. The voltage sensor 380 and the current sensor 382 may be provided between the power receiving unit 310 and the rectifying unit 330 (e.g., between the filter circuit 320 and the rectifying unit 330).

The charge ECU 360 includes a CPU, ROM, RAM, input/output ports, etc. (none of which is shown in the drawings). The charge ECU 360 receives signals from the above-indicated sensors, etc., and controls various devices in the power receiving device 20. Control of various devices is not necessarily implemented by software processing, but may be implemented with a dedicated hardware (e.g., an electronic circuit).

As main control performed by the charge ECU 360, the charge ECU 360 produces a target (target power) of transmission power for use in the power transmission device 10, so that the electric power received by the power receiving device 20 becomes equal to a desired target, while the power is being received from the power transmission device 10. More specifically, the charge ECU 360 produces a target of transmission power for use in the power transmission device 10, based on a deviation between the target and detection value of the received power. Then, the charge ECU 360 transmits the target (target power) of transmission power thus produced, to the power transmission device 10, via the communicating unit 370.

The communicating unit 370 is configured to conduct wireless communication with the communicating unit 260 of the power transmission device 10. The communicating unit 370 transmits the target (target power) of transmission power produced in the charge ECU 360, to the power transmission device 10, gives and receives information concerning start/stop of electric power transfer, to and from the power transmission device 10, and transmits power receiving conditions (received voltage, received current, received power, etc.) of the power receiving device 20, to the power transmission device 10.

Figure 2:
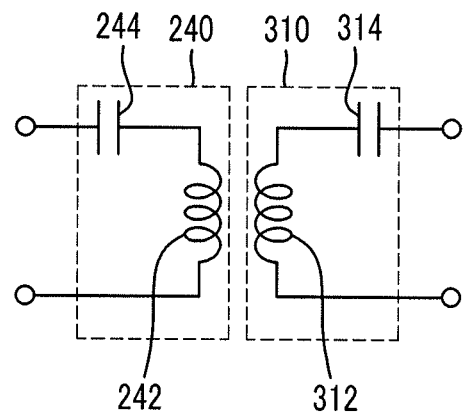
FIG. 2 is a view showing one example of the circuit configuration of a power transmitting unit and a power receiving unit shown in FIG. 1.

FIG. 2 shows one example of the circuit configuration of the power transmitting unit 240 and the power receiving unit 310 shown in FIG. 1. Referring to FIG. 2, the power transmitting unit 240 includes a power transmission coil 242 and a capacitor 244. The capacitor 244 is connected in series to the power transmission coil 242, and cooperates with the power transmission coil 242 to form a resonance circuit. The capacitor 244 is provided for adjusting the resonance frequency of the power transmitting unit 240. The Q value, which indicates the resonance intensity of the resonance circuit constituted by the power transmission coil 242 and the capacitor 244, is preferably 100 or larger.

The power receiving unit 310 includes a power receiving coil 312 and a capacitor 314. The capacitor 314 is connected in series to the power receiving coil 312, and cooperates with the power receiving coil 312 to form a resonance circuit. The capacitor 314 is provided for adjusting the resonance frequency of the power receiving unit 310. The Q value of the resonance circuit constituted by the power receiving coil 312 and the capacitor 314 is also preferably 100 or larger.

In each of the power transmitting unit 240 and the power receiving unit 310, the capacitor may be connected in parallel with the coil. Also, when it is possible to achieve a desired resonance frequency without providing any capacitor, each of the power transmitting unit 240 and the power receiving unit 310 may not be provided with a capacitor.

Although not particularly illustrated in the drawings, the structure of the power transmission coil 242 and the power receiving coil 312 is not particularly limited. For example, where the power transmitting unit 240 and the power receiving unit 310 are opposed to each other, a coil in a spiral form or a helical form, which is wound around an axis that extends along a direction in which the power transmitting unit 240 and the power receiving unit 310 are arranged, may be employed as each of the power transmission coil 242 and the power receiving coil 312. In another example, where the power transmitting unit 240 and the power receiving unit 310 are opposed to each other, a coil formed by winding an electric wire around a ferrite plate that extends in a direction normal to the direction in which the power transmitting unit 240 and the power receiving unit 310 are arranged may be employed as each of the power transmission coil 242 and the power receiving coil 312.

Referring again to FIG. 1, in the power transmission device 10 of the electric power transfer system, alternate current transmission power is supplied from the inverter 220 to the power transmitting unit 240 via the filter circuit 230. Each of the power transmitting unit 240 and the power receiving unit 310 includes a resonance circuit, and is designed to resonate at the frequency of the transmission power.

When the alternate current transmission power is supplied from the inverter 220 to the power transmitting unit 240 via the filter circuit 230, energy (electric power) transfers from the power transmitting unit 240 to the power receiving unit 310, via a magnetic field formed between the power transmission coil 242 of the power transmitting unit 240 and the power receiving coil 312 of the power receiving unit 310. The energy (electric power) transferred to the power receiving unit 310 is supplied to the power storage device 350 via the filter circuit 320 and the rectifying unit 330.

Figure 3:
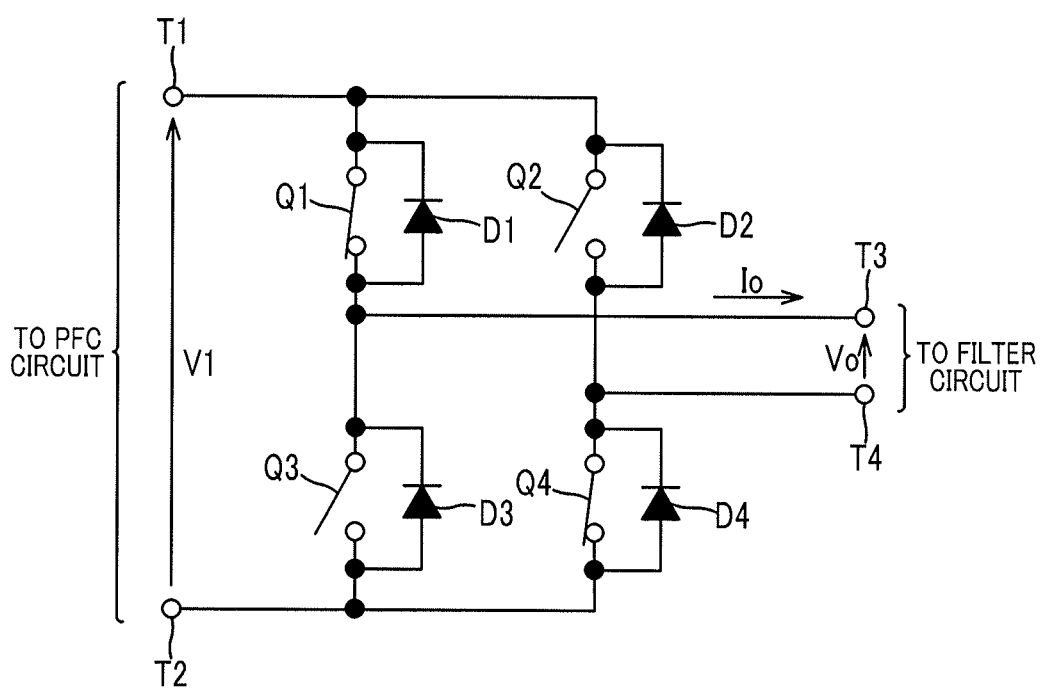
FIG. 3 is a view showing the circuit configuration of an inverter shown in FIG. 1.

Next, the current phase of the inverter and the turn-on current will be described. FIG. 3 shows the circuit configuration of the inverter 220 shown in FIG. 1.

Referring to FIG. 3, the inverter 220 is a voltage inverter, and includes power semiconductor switching devices (which will also be simply called "switching devices") Q1-Q4, and flyback diodes D1-D4. The PFC circuit 210 (FIG. 1) is connected to direct current-side terminals T1, T2, and the filter circuit 230 (FIG. 1) is connected to alternate current-side terminals T3, T4.

Each of the switching devices Q1-Q4 is provided by, for example, an insulated gate bipolar transistor (IGBT), bipolar transistor, metal-oxide-semiconductor field-effect transistor (MOSFET), gate turn-off thyristor (GTO), or the like. The flyback diodes D1-D4 are connected in inverse parallel with the switching devices Q1-Q4, respectively.

A direct current voltage V1 delivered from the PFC circuit 210 is applied between the terminals T1, T2. As the switching devices Q1-Q4 perform switching operation, output voltage Vo and output current Io appear between the terminals T3, T4 (in FIG. 3, directions indicated by arrows denote positive values). In FIG. 3, the switching devices Q1, Q4 are in the ON states, and the switching devices Q2 and Q3 are in the OFF states. In this condition, the output voltage Vo is approximately equal to voltage V1 (positive value).

Figure 4:
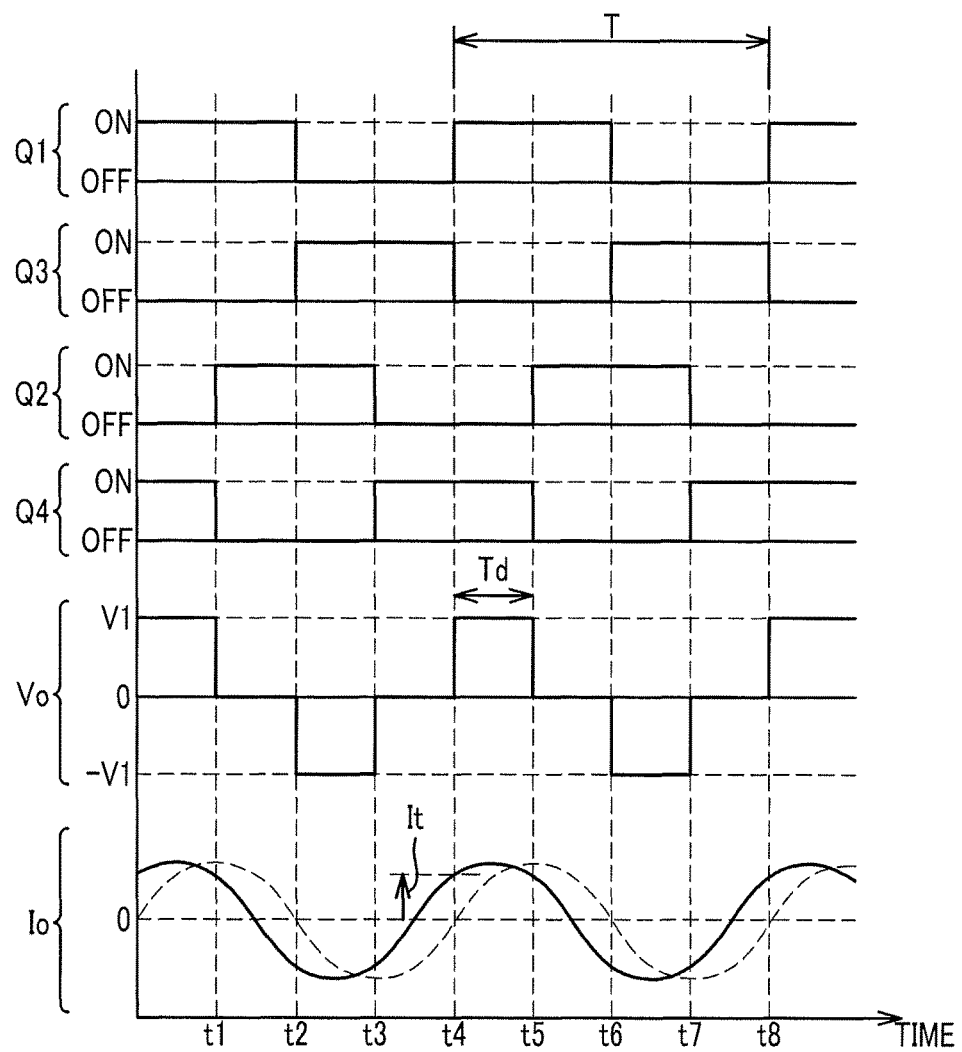
FIG. 4 is a view showing switching waveforms of the inverter, and waveforms of output voltage and output current, in the power transfer system.

FIG. 4 shows switching waveforms of the inverter 220, and waveforms of the output voltage Vo and output current Io. Referring to FIG. 3 as well as FIG. 4, the switching devices Q1-Q4 are turned ON/OFF as shown in FIG. 4, so that the square-wave output voltage Vo that varies at the switching frequency is produced. Namely, it is possible to adjust the frequency of the transmission power produced by the inverter 220, by manipulating or controlling the switching frequency of the inverter 220.

The current waveform indicated by the dotted line in FIG. 4 represents the output current Io at the time when the phase difference between the output current Io and the output voltage Vo is equal to 0. On the other hand, the current waveform indicated by the solid line in FIG. 4 represents the output current Io at the time when the phase of the output current Io leads the phase of the output voltage Vo. If the phase of the output current Io leads that of the output voltage Vo, current flows in the reverse direction, namely, recovery current flows, through the flyback diode D3 (FIG. 3) connected in inverse parallel with the switching device Q3, when the switching device Q1 is turned ON. If the recovery current flows through the flyback diode D3, the flyback diode D3 may be damaged or broken. When the phase difference between the output voltage Vo and the output current Io is equal to 0 (dotted line), or when the phase of the output current Io lags behind that of the output voltage Vo (not shown), no recovery current flows through the flyback diode D3.

The phase of the output current Io relative to that of the output voltage Vo can be controlled by adjusting (manipulating) the switching frequency of the inverter 220 (the frequency of the transmission power). Thus, in this embodiment, when the phase of the output current Io leads that of the output voltage Vo, the switching frequency of the inverter 220 (the frequency of the transmission power) is adjusted in such a direction as to delay the phase of the current.

An instantaneous value of the output current Io at the time when the output voltage Vo rises (at time t4 or time t8) indicates turn-on current It, and the phase lead of the output current Io relative to the phase of the output voltage Vo can be detected depending on whether positive turn-on current It flows, as is understood from FIG. 4. Thus, in this embodiment, when the turn-on current It is detected, and the turn-on current It is larger than 0, the frequency is adjusted in such a direction as to reduce the turn-on current It (turn-on current control).

The turn-on current It can be detected based on the output voltage Vo and the output current Io detected by the voltage sensor 270 and the current sensor 272 (FIG. 1), respectively. More specifically, the turn-on current It can be detected by detecting the output current Io at the time when the output voltage Vo rises.

In FIG. 4, T denotes the switching period of the inverter 220, and Td denotes the output time of the output voltage Vo. The period ratio of Td to period T is defined as the duty of the inverter output voltage. By changing the ON/OFF timing (ON/OFF period ratio: 0.5) of the switching devices Q2, Q4 with respect to the ON/OFF timing (ON/OFF period ratio: 0.5) of the switching devices Q1, Q3, the duty of the inverter output voltage can be adjusted.

Figure 5:
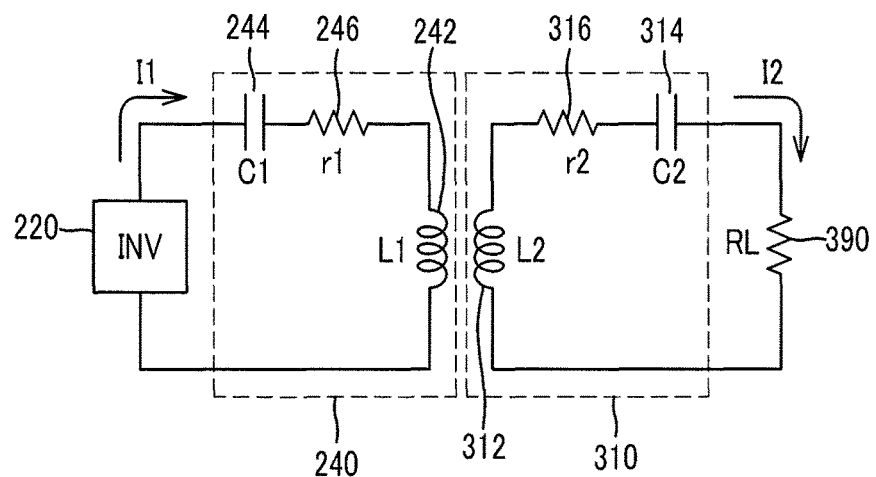
FIG. 5 is an equivalent circuit diagram useful for explaining the efficiency of electric power transfer from the power transmitting unit to the power receiving unit, in the power transfer system.

Next, the relationship between the current flowing through the power transmission coil and the power transfer efficiency will be described. FIG. 5 is an equivalent circuit diagram useful for explaining the efficiency of power transfer from the power transmitting unit 240 to the power receiving unit 310. Referring to FIG. 5, in the power transmitting unit 240, L1 denotes the inductance of the power transmission coil 242, and C1 denotes the capacitance of the capacitor 244. A resistance component 246 indicates coil resistance of the power transmission coil 242, and r1 denotes its resistance value. In the equivalent circuit diagram, the filter circuit 230 (FIG. 1) of the power transmission device 10 is not illustrated.

On the other hand, in the power receiving unit 310, L2 denotes the inductance of the power receiving coil 312, and C2 denotes the capacitance of the capacitor 314. A resistance component 316 indicates the coil resistance of the power receiving coil 312, and r2 denotes its resistance value. A load 390 comprehensively indicates a circuit including the filter circuit 320 (FIG. 1) and components downstream of the circuit 320 in the power receiving device 20, and RL indicates its impedance.

In the circuit configuration as described above, the efficiency η of power transfer between the power transmission coil 242 and the power receiving coil 312 is expressed by the following equation.

$$\eta = \frac{RL}{RL + r2 + r1\left|\frac{I1}{I2}\right|^2} \quad (1)$$

In Eq. (1) above, I1 denotes current flowing through the power transmission coil 242 (i.e., current Is), and I2 denotes current flowing through the power receiving coil 312. Since the voltage of the load 390 is restricted or bound by the power storage device 350 (FIG. 1), the current I2 and the impedance RL are substantially constant under a condition that the electric power is maintained. Accordingly, it will be understood from Eq. (1) that the power transfer efficiency η is inversely proportional to the square of the current IL. Namely, the power transfer efficiency η is higher as the current flowing through the power transmission coil 242 is smaller.

Figure 6:
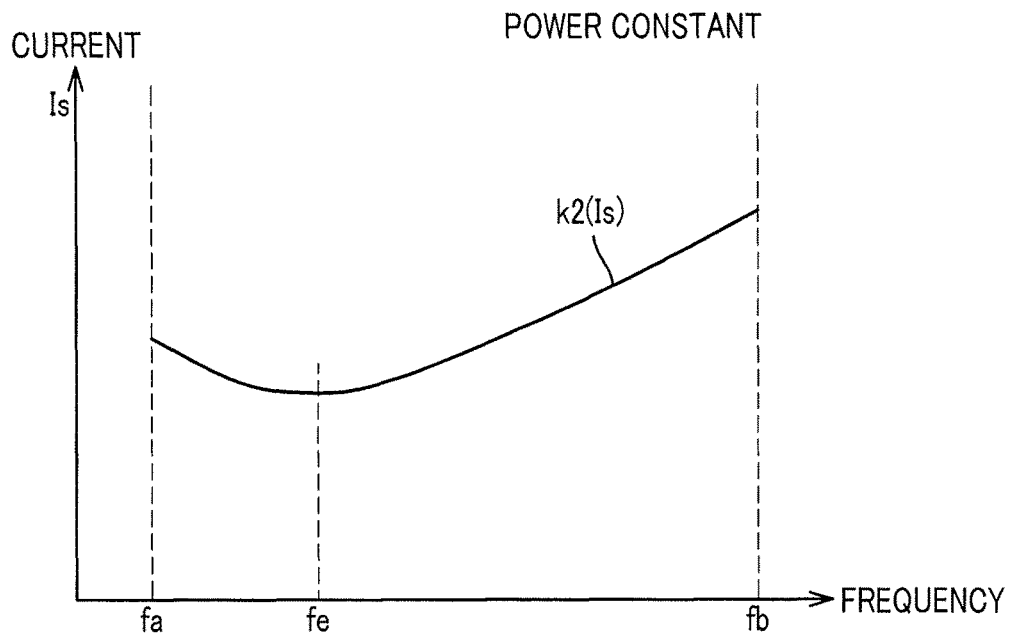
FIG. 6 is a view showing, by way of example, the frequency dependence of current flowing through a power transmission coil, under a condition that transmission power is constant.

FIG. 6 illustrates the frequency dependence of the current Is flowing through the power transmission coil 242 under a condition that the transmission power is constant.

Referring to FIG. 6, the horizontal axis indicates the frequency of transmission power which can be adjusted by manipulating the switching frequency of the inverter 220. Frequency fa indicates the lower limit of an adjustable range of the frequency, and frequency fb indicates the upper limit of the adjustable range of the frequency. The adjustable range of the frequency is predetermined in view of the efficiency of power transfer between the power transmitting unit 240 and the power receiving unit 310, for example.

As shown in FIG. 6, in this example, the current varies along a curve that is convexed downward as the frequency changes, in the adjustable range of the frequency. At frequency fe, the current Is has the smallest magnitude in the adjustable range of the frequency.

It will be understood from the frequency dependence of the magnitude of the current Is that the current Is can be reduced by adjusting the frequency of the transmission power, even under a condition that the transmission power is constant. For example, when the frequency is equal to fb, it is possible to reduce the current Is flowing through the power transmission coil 242, without reducing the transmission power, by controlling the frequency to fe.

Thus, in this embodiment, the switching frequency of the inverter 220 is manipulated and the frequency of the transmission power is adjusted, so that the current Is flowing through the power transmission coil 242 is minimized, under the condition that the transmission power is kept constant (power transmission coil current control).

Next, each control will be described. In the power transmission device 10 according to this embodiment, the transmission power control, power transmission coil current control, and turn-on current control are performed. The transmission power control is performed so that desired charging power is obtained in the power receiving device 20. The power transmission coil current control is performed so as to enhance the efficiency of power transfer between the power transmitting unit 240 and the power receiving unit 310. The turn-on current control is performed for the sake of component protection of the inverter 220 (breakage prevention of the flyback diode D3).

All of the above controls are performed by manipulating the frequency. Therefore, when all of these controls are implemented at the same time, the output (frequency manipulation) of one of the controls may have an adverse influence on another control. Of the purposes of the respective controls, the component protection (protection of the inverter 220) to be achieved by the turn-on current control should be prioritized over the electric power following by the transmission power control, and the improvement of the power transfer efficiency by the power transmission coil current control.

Thus, in the power transmission device 10 according to this embodiment, the transmission power control and the power transmission coil current control are not allowed to be executed during execution of the turn-on current control, and the transmission power control and the power transmission coil current control are allowed to be executed while the turn-on current control is not being executed. Namely, the turn-on current control is performed, taking priority over the transmission power control and the power transmission coil current control. Thus, the component protection (protection of the inverter 220) can be achieved with reliability.

Also, in the power transmission device 10 according to this embodiment, after the transmission power once reaches the target of the transmission power after start-up of the inverter 220, the power transmission coil current control is not executed during execution of the transmission power control while the turn-on current control is not being executed, and the transmission power control is not executed during execution of the power transmission coil current control while the turn-on current control is not being executed.

In the above manner, the power transmission coil current control can be prevented from negatively affecting the transmission power control, during execution of the transmission power control. Also, the transmission power control can be prevented from negatively affecting the power transmission coil current control, during execution of the power transmission coil current control.

Further, in the power transmission device 10 according to this embodiment, after the transmission power once reaches the target of the transmission power after start-up of the inverter 220, the transmission power control is executed when the turn-on current control is not executed and a difference (power deviation) between the target and detection value of the transmission power is equal to or larger than a threshold value (threshold value >0), and the power transmission coil current control is executed when the turn-on current control is not executed and the power deviation is smaller than the above-indicated threshold value.

In the above manner, when the power deviation is large, the transmission power control is performed, taking priority over the power transmission coil current control. On the other hand, when the power deviation is small, the power transmission coil current control is performed, taking priority over the transmission power control. Accordingly, the power following capability is ensured through the transmission power control when the power deviation is large, and the power transfer efficiency is improved through the power transmission coil current control when the power deviation is small.

Figure 7:
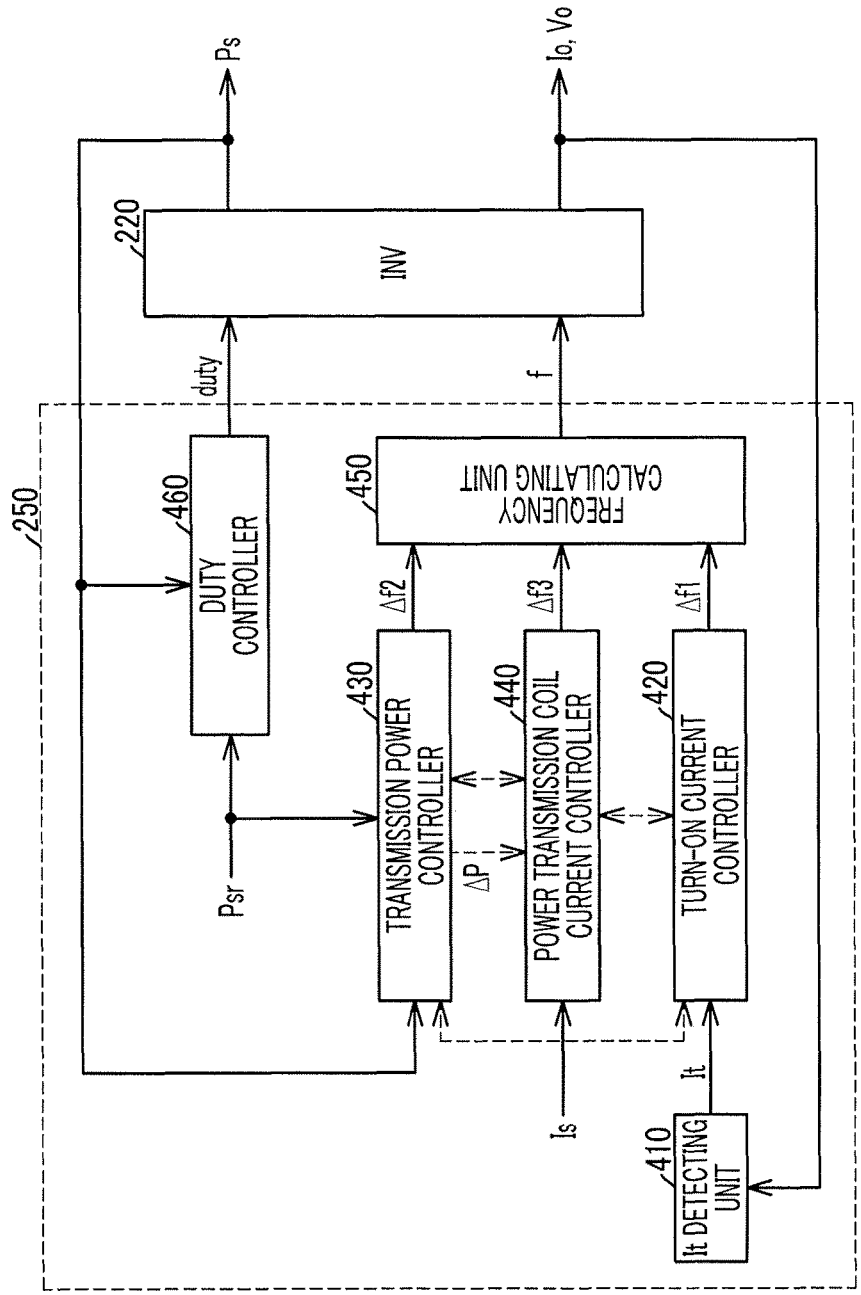
FIG. 7 is a control block diagram of control performed by a power-supply ECU, in the power transfer system.

FIG. 7 is a control block diagram of control performed by the power-supply ECU 250. Referring to FIG. 7, the power-supply ECU 250 includes a turn-on current detecting unit (which will also be called "It detecting unit") 410, turn-on current controller 420, transmission power controller 430, power transmission coil current controller 440, frequency calculating unit 450, and a duty controller 460.

The It detecting unit 410 detects the turn-on current It, based on detection values of the output voltage Vo and output current Io of the inverter 220. More specifically, the It detecting unit 410 detects a detection value of the output current Io obtained when the output voltage Vo rises, as the turn-on current It.

When the turn-on current It is larger than 0 (namely, when the phase of the output current Io of the inverter 220 leads the phase of the output voltage Vo of the inverter 220), the turn-on current controller 420 adjusts the frequency of the transmission power in such a direction as to delay the phase of the current. More specifically, when the turn-on current It is larger than 0, the turn-on current controller 420 outputs a frequency control amount Δf1 of the direction to reduce the turn-on current It.

Also, during execution of the turn-on current control, namely, when the turn-on current It is larger than 0, the turn-on current controller 420 informs the transmission power controller 430 and the power transmission coil current controller 440 that the turn-on current control is being performed. Details of the turn-on current controller 420 will be described later.

The transmission power controller 430 receives a target power Psr indicating a target of transmission power Ps, and a detection value of the transmission power Ps. The target power Psr is produced based on power receiving conditions of the power receiving device 20, for example. In this embodiment, in the power receiving device 20, the target power Psr of the transmission power Ps is produced based on a deviation between a target and a detection value of receiving electric power, and is transmitted from the power receiving device 20 to the power transmission device 10. The transmission power Ps is calculated based on detection values of the voltage sensor 270 and current sensor 272 (FIG. 1).

Then, the transmission power controller 430 adjusts the frequency of the transmission power so that the magnitude of the transmission power Ps approaches the target power Psr. More specifically, the transmission power controller 430 outputs a control amount Δf2 of the switching frequency of the inverter 220, so that the magnitude of the transmission power Ps approaches the target power Psr.

In the meantime, the transmission power controller 430 stops transmission power control when it is informed by the turn-on current controller 420 that the turn-on current control is being performed. Namely, when the turn-on current control is being performed, the transmission power controller 430 outputs the control amount Δf2 that is equal to 0. This is because the turn-on current control is prioritized over the transmission power control, during execution of the turn-on current control.

Also, after the inverter 220 is started, the transmission power controller 430 performs transmission power control, until a deviation ΔP (=Psr−Ps) between the target power Psr and the transmission power Ps becomes substantially equal to 0, (and stops the same control when the turn-on current control is performed). Then, once the transmission power Ps reaches the target power Psr, the transmission power controller 430 executes transmission power control within a range in which the power deviation ΔP is equal to or larger than a threshold value (threshold value >0) (and stops the same control when the turn-on current control is performed). In a range in which the power deviation ΔP is small, the transmission power control is stopped, and priority is given to the power transmission coil current control. The transmission power controller 430 outputs a value of the power deviation ΔP (=Psr−Ps) to the power transmission coil current controller 440. Details of the transmission power controller 430 will also be described later.

The power transmission coil current controller 440 receives a detection value of the current Is flowing through the power transmission coil 242. Then, the power transmission coil current controller 440 adjusts the frequency of the transmission power so that the current Is is minimized under a condition that the transmission power is maintained. More specifically, the power transmission coil current controller 440 calculates a control amount Δf3 of the switching frequency of the inverter 220, so that the current Is is minimized.

In the meantime, the power transmission coil current controller 440 stops power transmission coil current control, when it is informed by the turn-on current controller 420 that the turn-on current control is being performed. Namely, during execution of turn-on current control, the power transmission coil current controller 440 outputs the control amount Δf3 that is equal to 0. This is because the turn-on current control is prioritized over the power transmission coil current control, during execution of the turn-on current control.

Also, the power transmission coil current controller 440 receives a power deviation ΔP (=Psr−Ps) from the transmission power controller 430, and executes power transmission coil current control within a range in which the power deviation ΔP is smaller than a threshold value (which is the same value as the threshold value used in the transmission power controller 430). In a range in which the power deviation ΔP is large, the power transmission coil current control is stopped, and priority is given to electric power following through the transmission power control.

In this embodiment, known extremum seeking control for seeking an extreme value of a control quantity by giving an oscillation signal to a controlled object is applied to the power transmission coil current controller 440. While details of the control will be described later, the power transmission coil current controller 440 minutely oscillates the frequency of the transmission power, using known extremum seeking control, so as to seek the optimum frequency at which the current Is flowing through the power transmission coil 242 is minimized. Details of the power transmission coil current controller 440 will also be described later.

The frequency calculating unit 450 receives the control amount Δf1 of the turn-on current controller 420, control amount Δf2 of the transmission power controller 430, and the control amount Δf3 of the power transmission coil current controller 440. Then, the frequency calculating unit 450 calculates the total control amount of the frequency by adding the control amounts Δf1-Δf3 together, and calculates a frequency command value f so as to change the frequency by the calculated total control amount.

The duty controller 460 creates a duty command value of the output voltage of the inverter 220, based on a deviation (electric power deviation) between the target power Psr and the transmission power Ps. For example, the duty controller 460 calculates a control amount by performing PI control, or the like, using the power deviation as an input, and sets the control amount thus calculated, as the duty command value. The duty controller 460 adjusts the duty of the inverter output voltage so that the transmission power Ps approaches the target power Psr.

Figure 8:
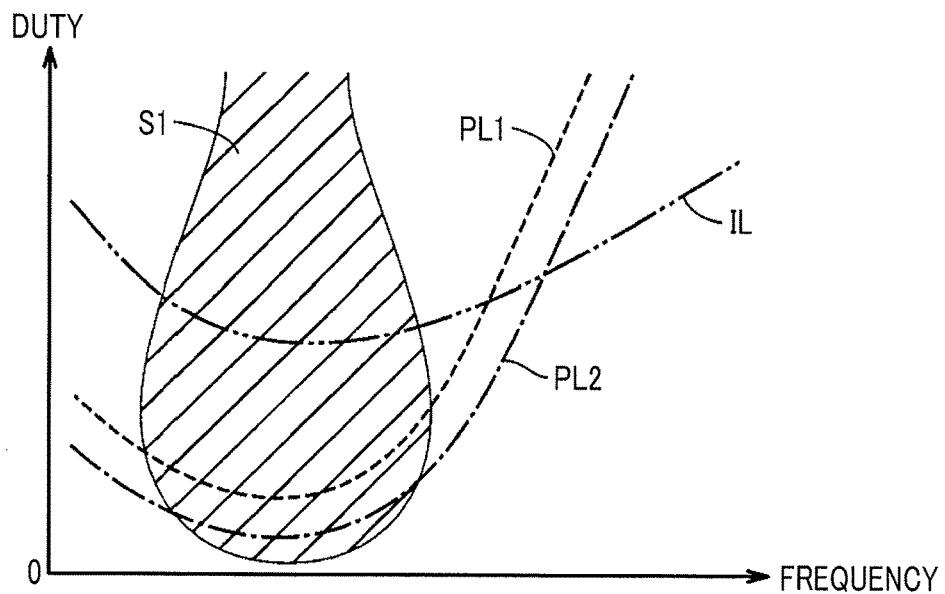
FIG. 8 is a view showing an operation region of turn-on current control, in the power transfer system.

FIG. 8 through FIG. 11 show respective operation regions of the turn-on current control, transmission power control, and the power transmission coil current control. FIG. 8 shows the operation region of the turn-on current control. Referring to FIG. 8, the horizontal axis indicates the frequency of the transmission power (the switching frequency of the inverter 220), and the vertical axis indicates the duty of the output voltage of the inverter 220.

Each of lines PL1, PL2 indicates a level line of transmission power. The transmission power indicated by the dotted line PL1 is larger than the transmission power indicated by the one-dot chain line PL2. In FIG. 8 through FIG. 12 that will be described below, line PL1 indicates a level line of the target power Ps, and line PL2 indicates a level line of transmission power that is smaller by a threshold value (>0) than the target power Psr. Two-dot chain line IL indicates one example of a level line of the current Is flowing through the power transmission coil 242.

In FIG. 8, hatched region S1 is a region in which the phase of the output current Io of the inverter 220 leads the phase of the output voltage Vo of the inverter 220. Namely, in the region S1, the turn-on current It is larger than 0, and the turn-on current control is performed.

Figure 9:
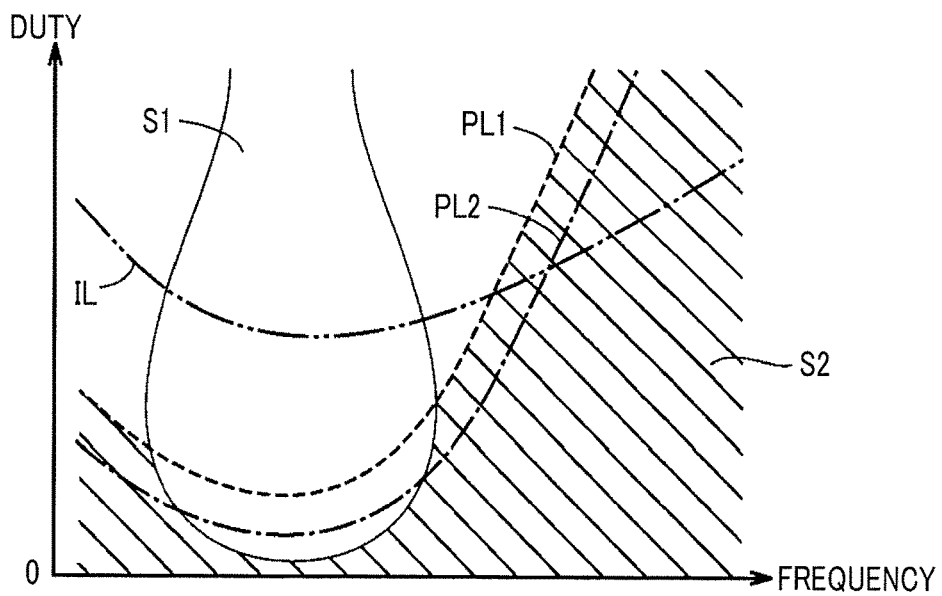
FIG. 9 is a view showing an operation region of transmission power control performed until the transmission power reaches a target transmission power, after start-up of the inverter, in the power transfer system.

FIG. 9 shows an operation region of transmission power control performed until the transmission power Ps reaches the target power Psr, after the inverter 220 is started. Referring to FIG. 9, hatched region S2 indicates the operation region of the transmission power control performed until the power deviation ΔP (=Psr−Ps) between the target power Psr and the transmission power Ps becomes substantially equal to 0 after start-up of the inverter 220.

Figure 10:
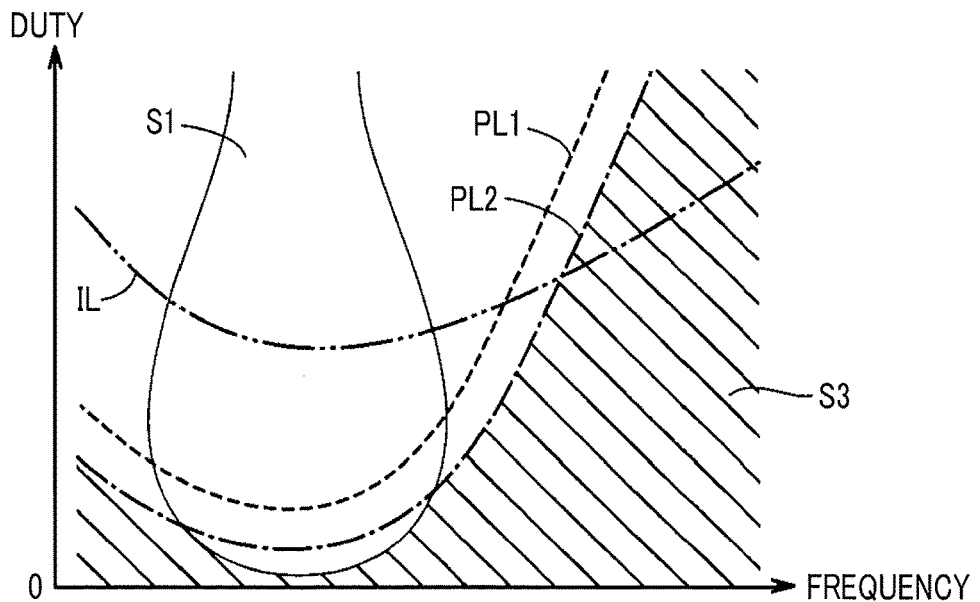
FIG. 10 is a view showing an operation region of transmission power control performed after the transmission power once reaches the target power, after start-up of the inverter, in the power transfer system.

FIG. 10 shows an operation region of transmission power control performed after the transmission power Ps once reaches the target power Psr, after start-up of the inverter 220. Referring to FIG. 10, hatched region S3 indicates the operation region of the transmission power control performed after the power deviation ΔP once becomes substantially equal to 0 after start-up of the inverter 220. As described above, after the transmission power Ps reaches the target power Psr, after start-up of the inverter 220, the transmission power control is executed within the range in which the power deviation ΔP is equal to or larger than the threshold value (threshold value >0).

In non-hatched regions of FIG. 9 and FIG. 10, the transmission power control based on frequency manipulation is not performed, but the duty control is performed by the duty controller 460 (FIG. 7); therefore, the duty of the inverter output voltage is controlled according to the power deviation ΔP.

Figure 11:
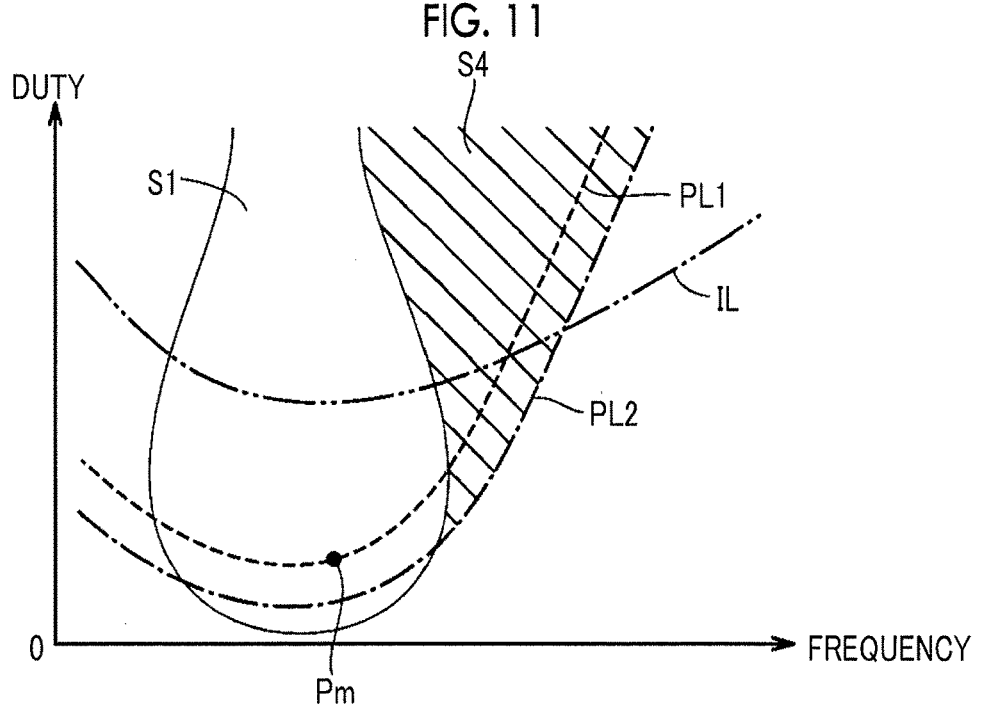
FIG. 11 is a view showing an operation region of power transmission coil current control performed after the transmission power once reaches the target power, after start-up of the inverter, in the power transfer system.

FIG. 11 shows an operation region of power transmission coil current control performed after the transmission power Ps once reaches the target power Psr, after start-up of the inverter 220. Referring to FIG. 11, hatched region S4 indicates the operation region of the transmission coil current control performed after the power deviation ΔP once becomes substantially equal to 0 after start-up of the inverter 220. In FIG. 11, point Pm indicates the optimum operating point at which the current Is flowing through the power transmission coil 242 is minimized, when the magnitude of the transmission power Ps is equal to the target power Psr (on line PL1). In the example shown in FIG. 11, the optimum operating point Pm lies within the region S1, namely, within the operation region of the turn-on current control; therefore, the operating point moves to a position that is located outside the region S1 and closest to the optimum operating point Pm.

Figure 12:
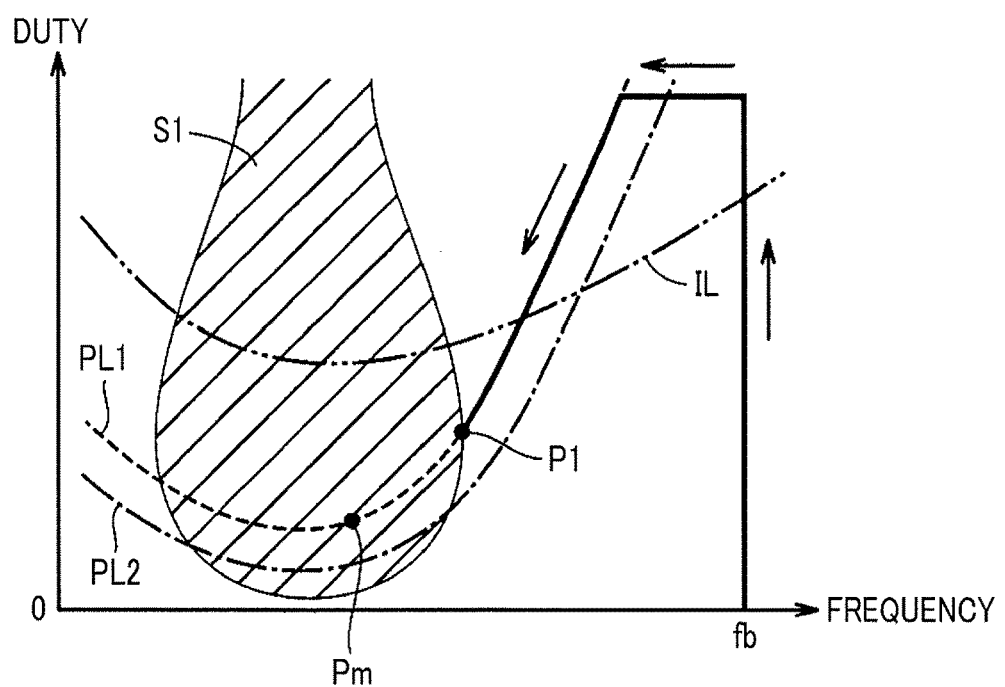
FIG. 12 is a view showing one example of movement of an operating point, after the inverter is started, in the power transfer system.

FIG. 12 shows one example of movement of the operating point after the inverter 220 is started. FIG. 12 typically illustrates the case where the frequency of transmission power (the switching frequency of the inverter 220) at the time of start-up of the inverter 220 is equal to the frequency fb at the upper limit of the adjustable range.

Immediately after the inverter 220 is started, the duty of the inverter output voltage rapidly increases under the duty control based on the power deviation. After the duty reaches the upper limit (0.5), the operation point moves toward the line PL1 indicating the target power Psr, through the transmission power control by frequency manipulation. At this stage, both of the transmission power control and the power transmission coil current control are performed, but no adverse influence arises from execution of both of these controls, since the frequency is adjusted in the same direction (in the direction to lower the frequency).

Once the operating point reaches a point on line PL1 (the power deviation ΔP is substantially equal to 0), the operation region of the transmission power control switches to the range (FIG. 10) of ΔP≥threshold value (threshold value >0); therefore, the transmission power control is stopped. As a result, the frequency is adjusted under the power transmission coil current control, so that the operating point moves toward the optimum operating point Pm. The operating point moves along the line PL1, because the frequency is adjusted (lowered) under the power transmission coil current control, and the duty is adjusted (reduced) based on the power deviation, under the duty control.

In the example of FIG. 12, the case where the optimum operating point Pm lies within the region S1, namely, within the operation region of the turn-on current control is illustrated. If the operating point enters the region S1, the turn-on current control is performed, taking priority over the transmission power control and the power transmission coil current control; therefore, the operating point moves toward the outside of the region S1. As a result, the operating point settles at around point P1 on the boundary of the region S1.

Figure 13:
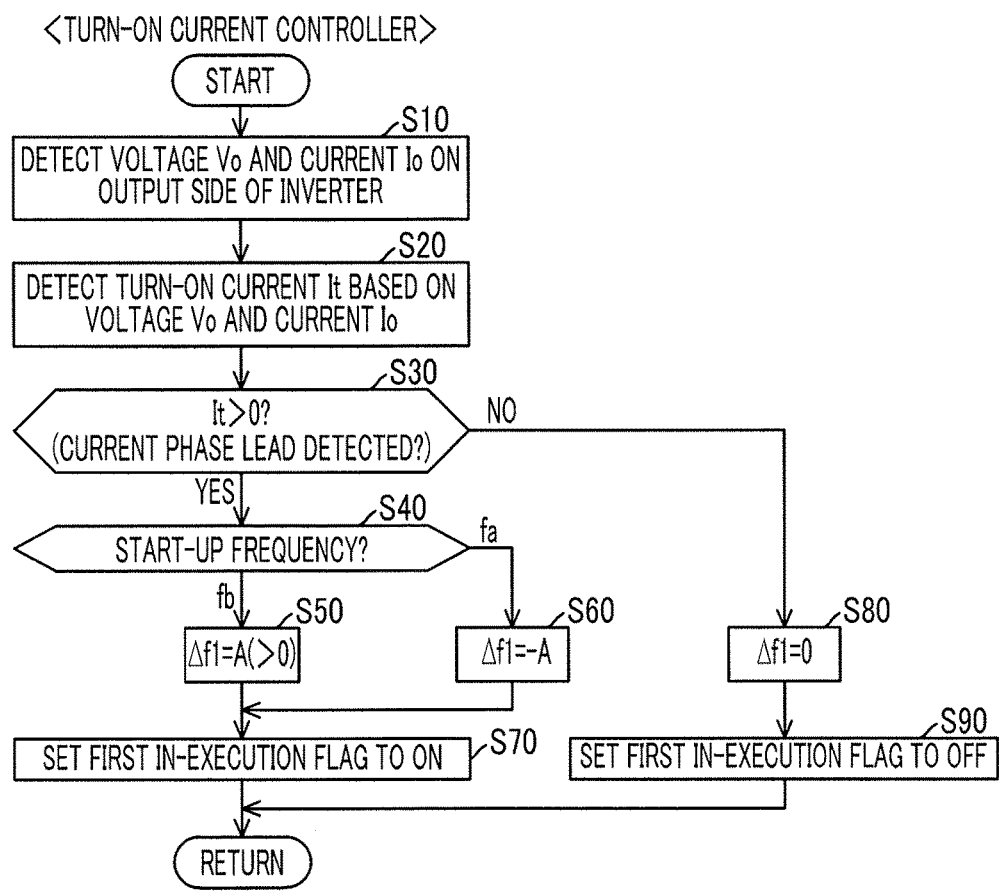
FIG. 13 is a flowchart illustrating a control routine performed in a turn-on current controller shown in FIG. 7.

Next, the turn-on current controller 420 will be described in detail. FIG. 13 is a flowchart illustrating a control routine performed in the turn-on current controller 420 shown in FIG. 7. The control routine illustrated in this flowchart is executed at given time intervals or if it is called for from a main routine when a certain condition is satisfied.

Referring to FIG. 13, the power-supply ECU 250 obtains respective detection values of the output voltage Vo and output current Io of the inverter 220 (step S10). Then, the power-supply ECU 250 detects the turn-on current It based on the detected output voltage Vo and output current Io (step S20). Then, the power-supply ECU 250 determines whether the turn-on current It is larger than 0 (namely, whether phase lead of current is detected) (step S30).

If it is determined that the turn-on current It is larger than 0 (YES in step S30), the power-supply ECU 250 determines whether the frequency (start-up frequency) at the start-up of the inverter 220 is equal to the lower limit fa of the adjustable range, or the upper limit fb of the adjustable range (step S40).

If it is determined that the start-up frequency is fb ("fb" in step S40), the power-supply ECU 250 outputs A (a positive value) as the control amount M1 of the frequency (step S50). This is because, when the frequency is adjusted in such a direction as to lower the frequency, from the upper limit fb of the adjustable range, and the current phase is advanced in the process of the adjustment (the turn-on current It exceeds 0), the control amount Δf1 of the positive value is generated so as to raise the frequency, and thus promptly eliminate the phase lead of current.

On the other hand, if it is determined that the start-up frequency is fa ("fa" in step S40), the power-supply ECU 250 outputs −A (a negative value) as the control amount Δf1 of the frequency (step S60). This is because, when the frequency is adjusted in such a direction as to raise the frequency from the lower limit fa of the adjustable range, and the current phase is advanced in the process of the adjustment, the control amount M1 of the negative value is generated so as to lower the frequency, and thus promptly eliminate the phase lead of current.

If step S50 or step S60 is executed, the power-supply ECU 250 sets a first in-execution flag that indicates that the turn-on current control is being performed to ON (step S70). Setting the first in-execution flag to ON corresponds to informing the transmission power controller 430 and the power transmission coil current controller 440, from the turn-on current controller 420, that the turn-on current control is being performed, in FIG. 7.

If it is determined in step S30 that the turn-on current It is equal to or smaller than 0 (NO in step S30), the power-supply ECU 250 outputs 0 as the control amount Δf1 (step S80). Namely, the turn-on current control is not executed. Then, the power-supply ECU 250 sets the first in-execution flag to OFF (step S90).

Figure 14:
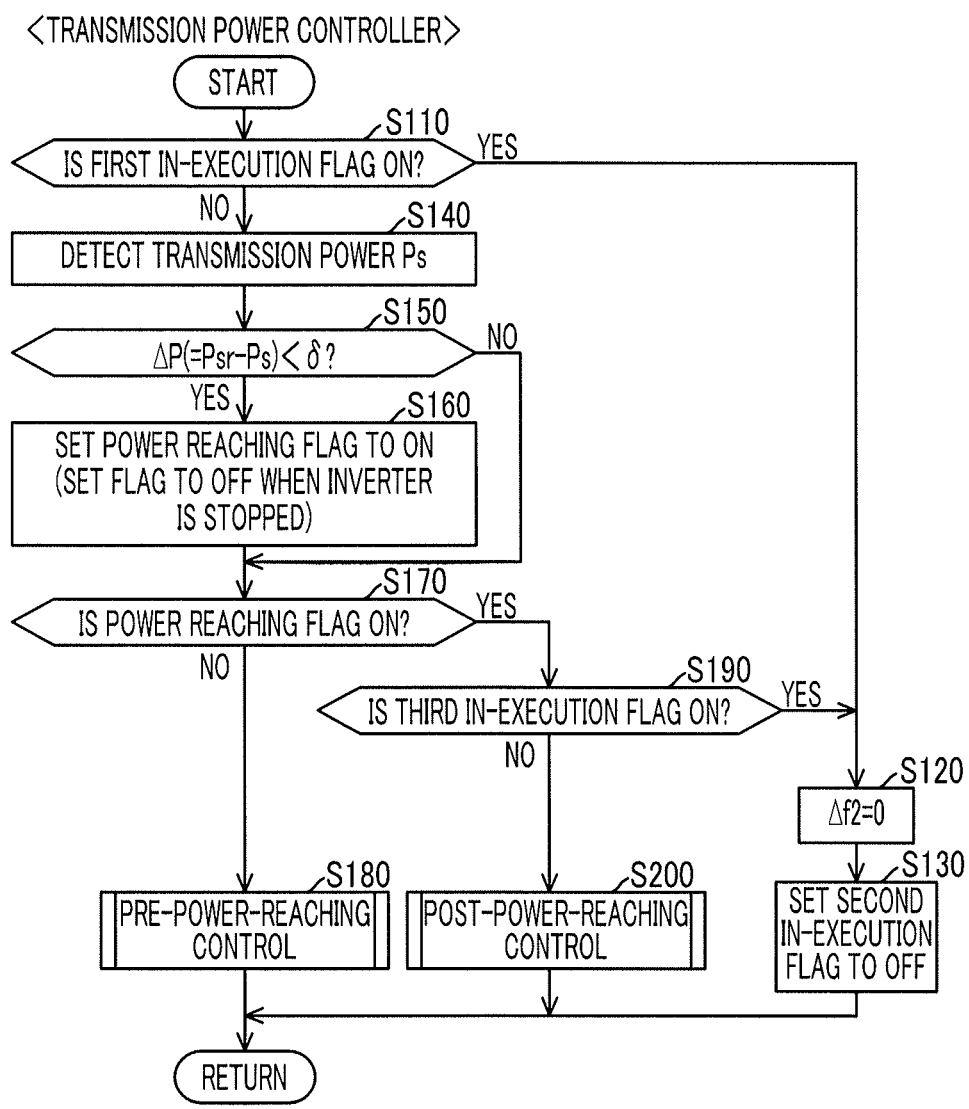
FIG. 14 is a flowchart illustrating a control routine performed in a transmission power controller shown in FIG. 7.

Next, the transmission power controller 430 will be described in detail. FIG. 14 is a flowchart illustrating a control routine performed in the transmission power controller 430 shown in FIG. 7. The control routine illustrated in this flowchart is executed at given time intervals or if it is called for from a main routine when a certain condition is satisfied.

Referring to FIG. 14, the power-supply ECU 250 determines whether the first in-execution flag indicating that the turn-on current control is being performed is ON (step S110). If it is determined that the first in-execution flag is ON (YES in step S110), the power-supply ECU 250 outputs 0 as the control amount Δf2 of the frequency (step S120). Namely, during execution of the turn-on current control, the turn-on current control is prioritized over the transmission power control, and the transmission power control is not executed. Then, the power-supply ECU 250 sets a second in-execution flag that indicates that the transmission power control is being performed to OFF (step S130).

If it is determined in step S110 that the first in-execution flag is OFF (NO in step S110), namely, if the turn-on current control is not being performed, the power-supply ECU 250 detects the transmission power Ps based on the respective detection values of the output voltage Vo and output current Io (step S140). Then, the power-supply ECU 250 calculates a deviation ΔP (=Psr−Ps) of transmission power, by subtracting the detection value of the transmission power Ps from the target power Psr, and determines whether the power deviation ΔP is smaller than a criterial value δ (step S150). The criterial value δ is an extremely small value, based on which it is determined whether the power deviation ΔP is substantially equal to 0.

If it is determined that the power deviation ΔP is smaller than the criterial value δ (YES in step S150), it is determined that the transmission power Ps has reached the target power Psr after start-up of the inverter 220, and the power-supply ECU 250 sets a power reaching flag to ON (step S160). If it is determined in step S150 that the power deviation ΔP is equal to or larger than the criterial value δ (NO in step S150), step S160 is not executed. After the transmission power Ps once reaches the target power Psr, the power reaching flag is kept in the ON state even if the power deviation ΔP becomes equal to or larger than the criterial value δ, and the power reaching flag is set to OFF when the inverter 220 is stopped.

Then, the power-supply ECU 250 determines whether the power reaching flag is ON (step S170). If it is determined that the power reaching flag is OFF (NO in step S170), the power-supply ECU 250 executes pre-power-reaching control (which will be described later) as control performed until the transmission power Ps once reaches the target power Psr (step S180).

On the other hand, if it is determined in step S170 that the power reaching flag is ON (YES in step S170), the power-supply ECU 250 determines whether a third in-execution flag (which will be described later) that indicates that the power transmission coil current control is being performed is ON (step S190). If it is determined that the third in-execution flag is ON (YES in step S190), the power-supply ECU 250 proceeds to step S120, and outputs 0 as the control amount Δf2. Namely, during execution of the power transmission coil current control, the transmission power control is not executed.

If it is determined in step S190 that the third in-execution flag is OFF (NO in step S190), the power-supply ECU 250 executes post-power-reaching control (which will be described later) as control performed after the transmission power Ps once reaches the target power Psr (step S200).

FIG. 15 is a flowchart illustrating a control routine of the pre-power-reaching control performed in step S180 of FIG. 14. Referring to FIG. 15, the power-supply ECU 250 determines whether the power deviation ΔP (=Psr−Ps) is equal to or larger than 0 (step S210). The operation region of the transmission power control is set to ΔP≥0 (region S2 of FIG. 9), until the transmission power Ps once reaches the target power Psr after start-up of the inverter 220 (when the power reaching flag is OFF).

If it is determined in step S210 that the power deviation ΔP is smaller than 0 (NO in step S210), the power-supply ECU 250 outputs 0 as the control amount Δf2 of the frequency (step S220). Namely, it is determined that the transmission power Ps has reached the target power Psr, and the transmission power control is not executed. Then, the power-supply ECU 250 sets a second in-execution flag that indicates that the transmission power control is being performed, to OFF (step S260).

If it is determined in step S210 that the power deviation ΔP is equal to or larger than 0 (YES in step S210), the power-supply ECU 250 determines whether the start-up frequency of the inverter 220 is equal to the lower limit fa of the adjustable range, or equal to the upper limit fb of the adjustable range (step S230).

If it is determined that the start-up frequency is fb ("fb" in step S230), the power-supply ECU 250 outputs −B (a negative value) as the control amount Δf2 of the frequency (step S240). This is because, when the frequency is adjusted in such a direction as to lower the frequency from the upper limit fb of the adjustable range, the control amount Δf2 of the negative value is generated, so as to lower the frequency, and thus make the transmission power Ps closer to the target power Psr.

On the other hand, if the start-up frequency is equal to fa in step S230 ("fa" in step S230), the power-supply ECU 250 outputs B (a positive value) as the control amount Δf2 of the frequency (step S250). This is because, when the frequency is adjusted in such a direction as to raise the frequency from the lower limit fa of the adjustable range, the control amount Δf2 of the positive value is generated, so as to raise the frequency and thus make the transmission power Ps closer to the target power Psr.

If step S240 or step S250 is executed, the power-supply ECU 250 proceeds to step S260, and sets the second in-execution flag to OFF. This is because the power transmission coil current control, as well as the transmission power control, is allowed to be performed, until the transmission power Ps once reaches the target power Psr after start-up of the inverter 220.

FIG. 16 is a flowchart illustrating a control routine of the post-power-reaching control performed in step S200 of FIG. 14. Referring to FIG. 16, the power-supply ECU 250 determines whether the power deviation ΔP (=Psr−Ps) is equal to or larger than a threshold value (threshold value >0) (step S310). After the transmission power Ps once reaches the target power Psr after start-up of the inverter 220 (when the power reaching flag is ON), the operation region of the transmission power control is set to ΔP≥threshold value (region S3 of FIG. 10).

If it is determined in step S310 that the power deviation ΔP is smaller than the threshold value (NO in step S310), the power-supply ECU 250 outputs 0 as the control amount Δf2 of the frequency (step S320). Namely, since the power deviation ΔP is small, the transmission power control is not executed. Then, the power-supply ECU 250 sets the second in-execution flag to OFF (step S330).

If it is determined in step S310 that the power deviation ΔP is equal to or larger than the threshold value (YES in step S310), the power-supply ECU 250 determines whether the start-up frequency of the inverter 220 is equal to the lower limit fa of the adjustable range, or equal to the upper limit fb of the adjustable range (step S340).

If it is determined that the start-up frequency is fb ("fb" in step S340), the power-supply ECU 250 outputs −B (a negative value) as the control amount Δf2 of the frequency (step S350). On the other hand, if it is determined in step S340 that the start-up frequency is fa ("fa" in step S340), the power-supply ECU 250 outputs B (a positive value) as the control amount Oft of the frequency (step S360).

If step S350 or step S360 is executed, the power-supply ECU 250 sets the second in-execution flag to ON (step S370). Setting the second in-execution flag to ON corresponds to informing the power transmission coil current controller 440, from the transmission power controller 430, that the transmission power control is being performed, in FIG. 7.

Figure 17:
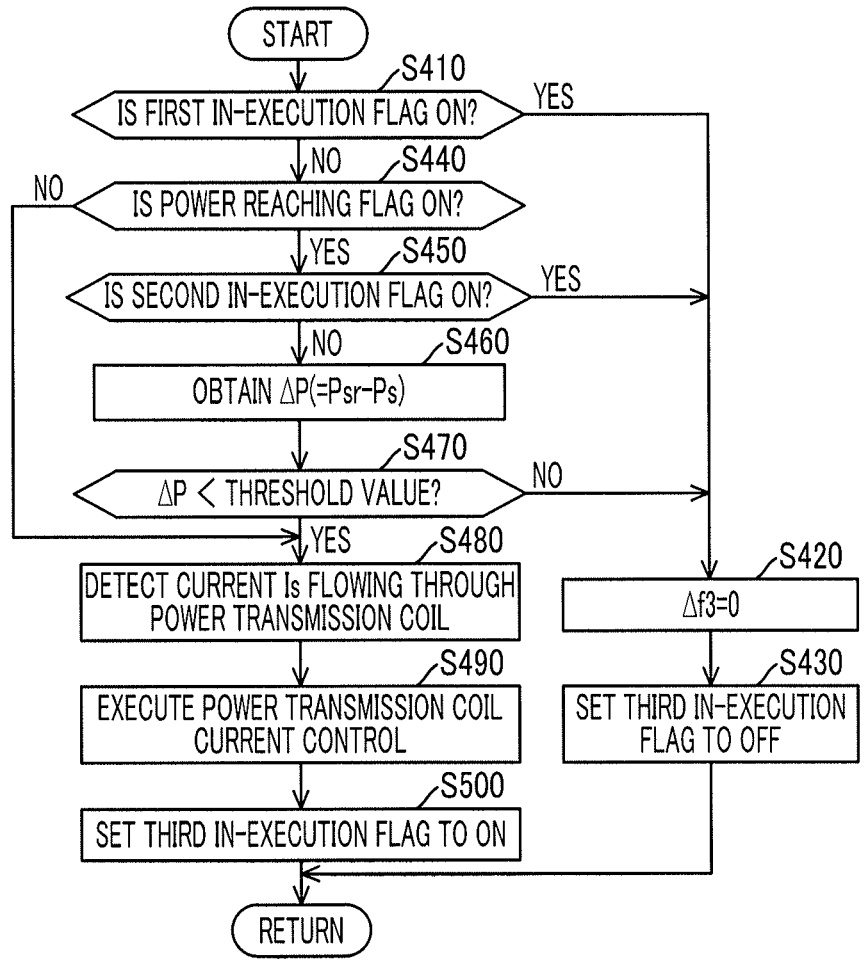
FIG. 17 is a flowchart illustrating a control routine performed in a power transmission coil current controller shown in FIG. 7.

Next, the power transmission coil current controller 440 will be described in detail. FIG. 17 is a flowchart illustrating a control routine performed in the power transmission coil current controller 440 shown in FIG. 7. The control routine illustrated in this flowchart is executed at given time intervals or if it is called for from a main routine when a certain condition is satisfied.

Referring to FIG. 17, the power-supply ECU 250 determines whether the first in-execution flag that indicates that the turn-on current control is being performed is ON (step S410). If it is determined that the first in-execution flag is ON (YES in step S410), the power-supply ECU 250 outputs 0 as the control amount Δf3 of the frequency (step S420). Namely, during execution of the turn-on current control, the turn-on current control is prioritized over the power transmission coil current control, and the power transmission coil current control is not executed. Then, the power-supply ECU 250 sets the third in-execution flag that indicates that the power transmission coil current control is being performed, to OFF (step S430).

If it is determined in step S110 that the first in-execution flag is OFF (NO in step S410), namely, if it is determined that the turn-on current control is not being performed, the power-supply ECU 250 determines whether the power reaching flag is ON (step S440). If it is determined that the power reaching flag is OFF (NO in step S440), subsequent steps S450-S470 are not executed, and the power-supply ECU 250 proceeds to step S480 (which will be described later).

If it is determined in step S440 that the power reaching flag is ON (YES in step S440), the power-supply ECU 250 determines whether the second in-execution flag that indicates that the transmission power control is being performed is ON (step S450). If it is determined that the second in-execution flag is ON (YES in step S450), the power-supply ECU 250 proceeds to step S420, and outputs 0 as the control amount Δf3 of the frequency. Namely, during execu-tion of the transmission power control, the power transmission coil current control is not executed.

If it is determined in step S450 that the second in-execution flag is OFF (NO in step S450), the power-supply ECU 250 obtains the power deviation ΔP (=Psr−Ps) between the target power Psr and the transmission power Ps (step S460). Then, the power-supply ECU 250 determines whether the power deviation ΔP is smaller than a threshold value (threshold value >0) (step S470). The threshold value is the same value as the threshold value used in step S310 shown in FIG. 16.

If it is determined in step S470 that the power deviation ΔP is equal to or larger than the threshold value (NO in step S470), the power-supply ECU 250 proceeds to step S420, and outputs 0 as the control amount Δf3 of the frequency. Namely, the power transmission coil current control is not executed. On the other hand, if it is determined in step S470 that the power deviation ΔP is smaller than the threshold value (YES in step S470), the power-supply ECU 250 obtains a detection value of the current Is flowing through the power transmission coil 242 (step S480). Then, the power-supply ECU 250 performs the power transmission coil current control (step S490). The power transmission coil current control will be described in detail later.

If the power transmission coil current control is executed, the power-supply ECU 250 sets the third in-execution flag indicating that the power transmission coil current control is being performed, to ON (step S500). Setting the third in-execution flag to ON corresponds to informing the transmission power controller 430, from the power transmission coil current controller 440, that the power transmission coil current control is being performed, in FIG. 7.

Figure 18:
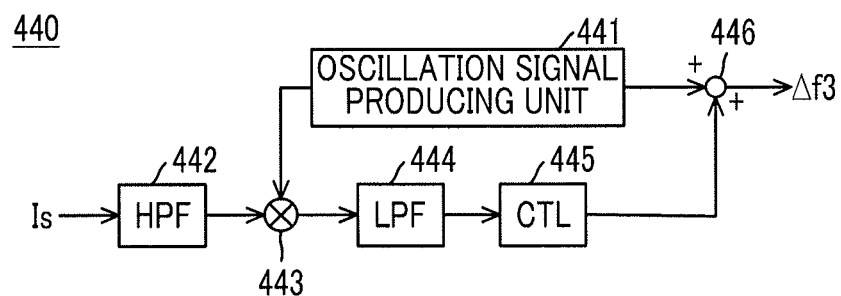
FIG. 18 is a control block diagram of power transmission coil current control performed in step S490 of FIG. 17.

FIG. 18 is a control block diagram of power transmission coil current control performed in step S490 of FIG. 17. This operation is performed by the power transmission coil current controller 440 shown in FIG. 7. Referring to FIG. 18, the power transmission coil current controller 440 includes an oscillation signal producing unit 441, high-pass filter (HPF) 442, multiplying unit 443, low-pass filter (LPF) 444, controller 445, and an adding unit 446. The above-mentioned extremum seeking control is implemented by these components.

The oscillation signal producing unit 441 produces an oscillation signal having a sufficiently small amplitude and a lower frequency. In the extremum seeking control, shift of the frequency of the transmission power to the optimum frequency (frequency at which the current Is flowing through the power transmission coil 242 is minimized) is monitored, by using the above-mentioned oscillation signal.

The HPF 442 receives a detection value of the current Is flowing through the power transmission coil 242, and outputs a signal from which a direct current component of the current Is is removed. The HPF 442 serves to extract the slope (derivative) of the current Is when the frequency of the transmission power is oscillated based on the oscillation signal produced by the oscillation signal producing unit 441.

The multiplying unit 443 multiplies the signal (derivative of the current Is) generated from the HPF 442, by the oscillation signal produced by the oscillation signal producing unit 441, so as to calculate a coefficient of correlation between the oscillation signal and the current Is. The correlation coefficient indicates the direction of increase or decrease of the current Is when the frequency is varied.

The LPF 444 extracts a direct current component of the correlation coefficient computed by the multiplying unit 443. The output of the LPF 444 indicates the control direction (increasing/decreasing direction) of the frequency in which the frequency is shifted to the optimum frequency. The LPF 444 may be omitted.

The controller 445 calculates the control amount of the frequency for shifting the frequency to the optimum frequency, based on the output of the LPF 444. For example, the controller 445 calculates the control amount of the frequency, by performing I control (integral control) using the output signal of the LPF 444 as its input.

The adding unit 446 adds the oscillation signal produced by the oscillation signal producing unit 441, to the output of the controller 445, and sets its computation value as the final control amount $\Delta f3$ of the frequency. The control structure as described above makes it possible to seek the optimum frequency at which the current Is flowing through the power transmission coil 242 is minimized, and calculate the control amount $\Delta f3$ for minimizing the current Is.

As described above, in this embodiment, the transmission power control and the power transmission coil current control are not executed during execution of the turn-on current control performed when the turn-on current It becomes larger than 0, and the transmission power control and the power transmission coil current control are allowed to be executed when the turn-on current control is not executed. Namely, the turn-on current control is performed, taking priority over the transmission power control and the power transmission coil current control. Accordingly, with this embodiment, component protection (protection of the inverter 220) can be achieved with reliability by the turn-on current control.

Also, in this embodiment, after the transmission power once reaches the target after start-up of the inverter 220, the power transmission coil current control is not executed while the turn-on current control is not executed and the transmission power control is executed, and the transmission power control is not executed while the turn-on current control is not executed and the power transmission coil current control is executed. Accordingly, with this embodiment, during execution of the transmission power control, the power transmission coil current control can be prevented from adversely affecting the transmission power control. Also, during execution of the power transmission coil current control, the transmission power control can be prevented from adversely affecting the power transmission coil current control.

Further, in this embodiment, after the transmission power once reaches the target after start-up of the inverter 220, the transmission power control is executed when the turn-on current control is not executed and the difference (power deviation) $\Delta P$ between the target and detection value of the transmission power is equal to or larger than the threshold value (threshold value >0), and the power transmission coil current control is executed when the turn-on current control is not executed and the power deviation $\Delta P$ is smaller than the threshold value. Thus, when the power deviation $\Delta P$ is large, the transmission power control is performed, taking priority over the power transmission coil current control, so that the electric power following capability can be ensured through the transmission power control. On the other hand, when the power deviation $\Delta P$ is small, the power transmission coil current control is performed, taking priority over the transmission power control, so that the power transfer efficiency can be improved through the power transmission coil current control.

While the turn-on current control is performed when the turn-on current It is larger than 0 in the above-described embodiment, the threshold value based on which the turn-on current control is performed is not necessarily and exactly equal to 0. For example, the phase of the output current I may be allowed to lead that of the output voltage Vo, to such an extent that the phase lead does not result in breakage of the inverter 220 (flyback diode D3), and the threshold value based on which the turn-on current control is performed may be set to a small positive value. In another method, the threshold value based on which the turn-on current control is performed may be a negative value, with a margin provided, so that a positive turn-on current It is prevented from flowing as much as possible.

In the above description, the power-supply ECU 250 corresponds to one example of "electronic control unit" according to the present disclosure. Also, the turn-on current control corresponds to one example of "first control" according to the present disclosure, and the turn-on current controller 420 corresponds to one example "first controller" according to the present disclosure.

Further, the transmission power control corresponds to one example of "second control" according to the present disclosure, and the transmission power controller 430 corresponds to one example of "second controller" according to the present disclosure. Also, the power transmission coil current control corresponds to one example of "third control" according to the present disclosure, and the power transmission coil current controller 440 corresponds to one example of "third controller" according to the present disclosure.

The embodiment disclosed herein should be considered as being exemplary and not restrictive in all respects. The scope of the present disclosure is indicated or defined by the appended claims, rather than the above description of the embodiment, and is intended to include all changes within the range of the claims and equivalents thereof.

What is claimed is:

1. A power transmission device, comprising:
   a power transmission coil configured to contactlessly transmit electric power to a power receiving device;
   an inverter that is a voltage inverter, the inverter being configured to produce transmission power of an alternate current and to supply the transmission power to the power transmission coil; and
   an electronic control unit configured to:
   (i) control the inverter so as to adjust a frequency of the transmission power, and
   (ii) inhibit second control and third control from being executed during execution of first control, and execute at least one of the second control or the third control while the first control is not being executed,
   the first control adjusting the frequency in such a direction as to delay a phase of an output current of the inverter, when the phase of the output current leads a phase of an output voltage of the inverter,
   the second control adjusting the frequency such that a magnitude of the transmission power approaches a target of the transmission power, and
   the third control adjusting the frequency such that a current flowing through the power transmission coil is minimized under a condition that the transmission power is maintained.

2. The power transmission device according to claim 1, wherein
   the electronic control unit is configured not to execute the third control during execution of the second control, and not to execute the second control during execution of the third control, while the first control is not being executed, after the transmission power once reaches the target of the transmission power after start-up of the inverter.

3. The power transmission device according to claim 2, wherein
the electronic control unit is configured to execute the second control when a difference between the target of the transmission power and a detection value of the transmission power is equal to or larger than a threshold value, and to execute the third control when the difference is smaller than the threshold value, while the first control is not being executed after the transmission power once reaches the target of the transmission power after start-up of the inverter.

4. An electric power transfer system, comprising:
a power transmission device; and
a power receiving device configured to contactlessly receive electric power from the power transmission device, wherein:
the power transmission device includes a power transmission coil, an inverter, and an electronic control unit:
the power transmission coil is configured to contactlessly transmit electric power to the power receiving device;
the inverter is a voltage inverter, and is configured to produce transmission power of an alternate current and to supply the transmission power to the power transmission coil; and
the electronic control unit is configured to:
(i) control the inverter so as to adjust a frequency of the transmission power, and
(ii) inhibit second control and third control from being executed during execution of first control, and execute at least one of the second control or the third control while the first control is not being executed,
the first control adjusts the frequency in such a direction as to delay a phase of an output current of the inverter, when the phase of the output current leads a phase of an output voltage of the inverter,
the second control adjusts the frequency such that a magnitude of the transmission power approaches a target of the transmission power, and
the third control adjusts the frequency such that a current flowing through the power transmission coil is minimized under a condition that the transmission power is maintained.

* * * * *